United States Patent [19]
Jones

[11] Patent Number: 5,112,071
[45] Date of Patent: May 12, 1992

[54] ATTACHMENT ASSEMBLY FOR A BICYCLE MUDGUARD

[76] Inventor: Richard J. Jones, Wheal Cottage, Mount Wise, Newquay, Cornwall, England

[21] Appl. No.: 713,569

[22] Filed: Jun. 11, 1991

Related U.S. Application Data

[63] Continuation of Ser. No. 525,834, May 18, 1990, abandoned.

[51] Int. Cl.⁵ .............................................. B62D 25/18
[52] U.S. Cl. ................... 280/152.3; 403/142; D12/186
[58] Field of Search ............... 280/152.1, 152.2, 152.3, 280/154, 158.1, 160.1, 288.4, 848, 851, 852, 202, 204; 403/141, 142, 143; D12/114, 184, 185, 186, 111, 126

[56] References Cited

U.S. PATENT DOCUMENTS

| | | | |
|---|---|---|---|
| D. 257,122 | 9/1980 | Price | D 12/114 X |
| D. 316,995 | 5/1991 | Kowalski | D12/186 |
| D. 320,590 | 10/1991 | Dunn | D12/186 |
| 597,471 | 1/1898 | Nutsford | 280/158.1 |
| 892,105 | 6/1908 | White | 403/141 X |
| 958,052 | 5/1910 | Williams | 403/142 X |
| 973,319 | 10/1910 | Thunen | 403/141 X |
| 1,544,244 | 6/1925 | Lehmann et al. | 403/141 X |
| 2,825,268 | 3/1958 | De Mambro et al. | 403/143 X |
| 4,174,120 | 11/1979 | Freeman | 280/204 |
| 4,243,241 | 1/1981 | Davis | 280/158.1 |
| 4,319,763 | 3/1982 | White | 280/152.3 |
| 4,458,909 | 7/1984 | Morioka | 280/152.2 X |
| 4,485,884 | 12/1984 | Fukunaga et al. | 280/152.3 X |
| 4,980,805 | 12/1990 | Maglica et al. | 403/141 X |

FOREIGN PATENT DOCUMENTS

| | | | |
|---|---|---|---|
| 0092030 | 10/1983 | European Pat. Off. | |
| 657849 | 3/1938 | Fed. Rep. of Germany | 403/141 |
| 888325 | 12/1943 | France | 280/204 |
| 2610278 | 8/1988 | France | 280/852 |
| 17312 | of 1898 | United Kingdom | 280/152.3 |
| 1253816 | 11/1971 | United Kingdom | |

Primary Examiner—Andres Kashnikow
Assistant Examiner—Brian L. Johnson
Attorney, Agent, or Firm—Ware, Fressola et al.

[57] ABSTRACT

A bicycle mudguard includes a plastic moulding comprising a main aerofoil section and at one end of which a ball is provided. The ball cooperates with a pair of clamp members to form a ball and socket fitment for adjustable and releaseable attachment of the mudguard to one of marious members of the bicycle frame.

8 Claims, 3 Drawing Sheets

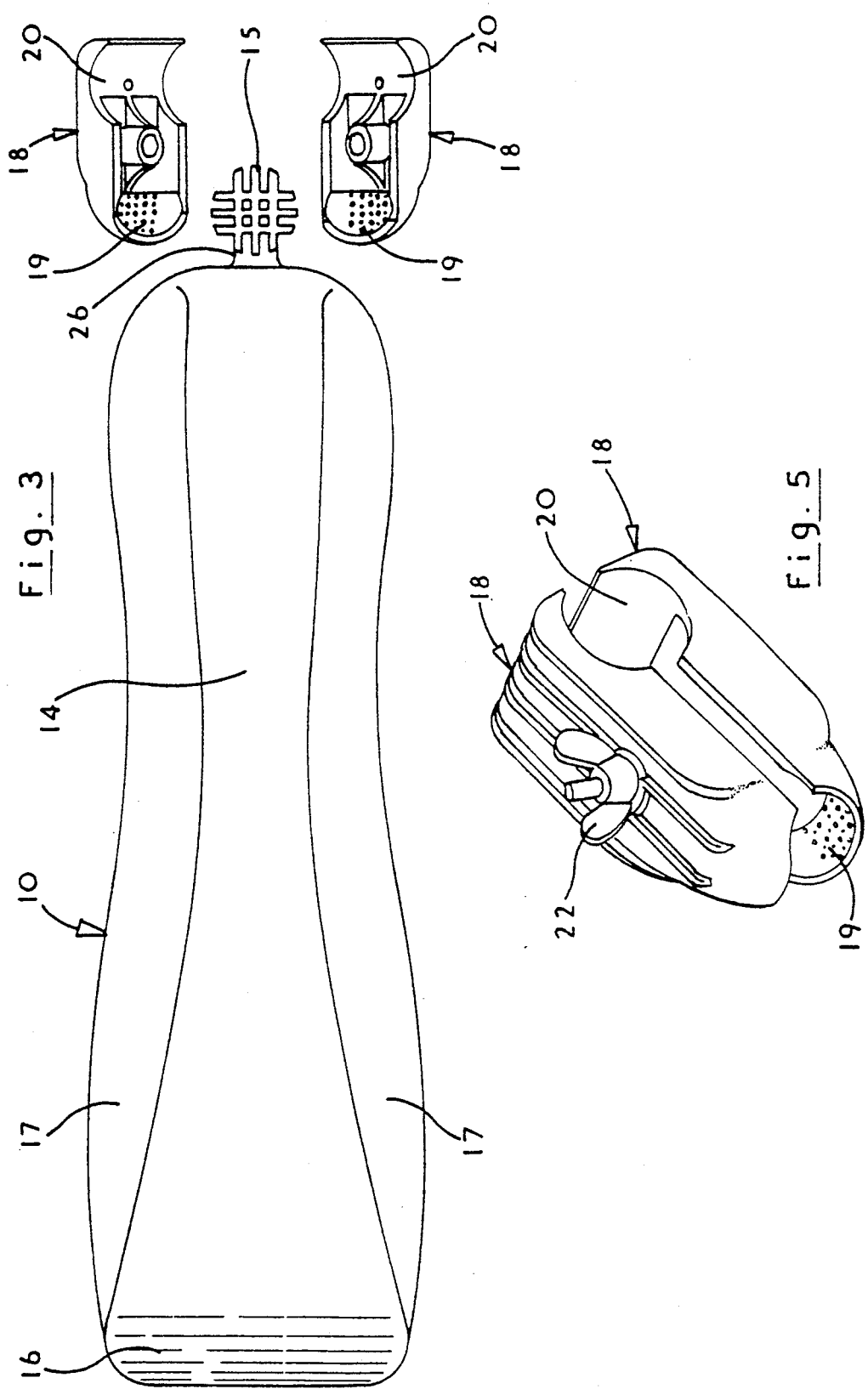

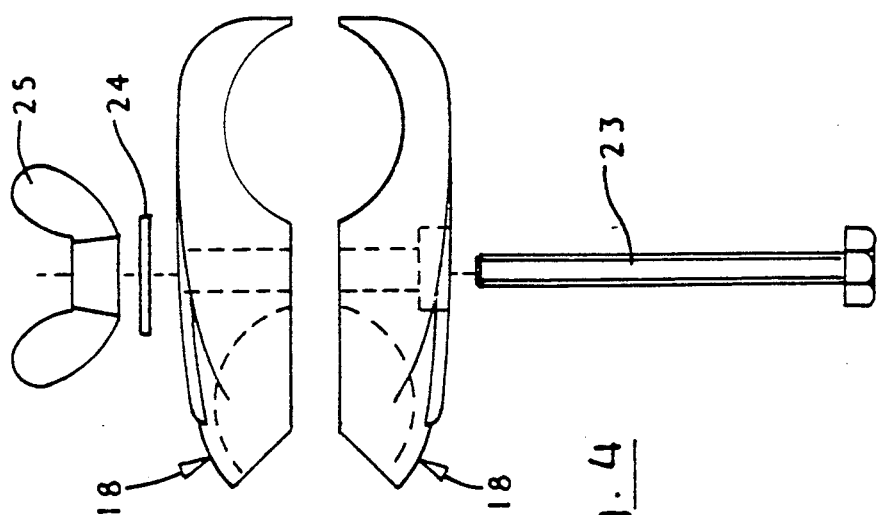
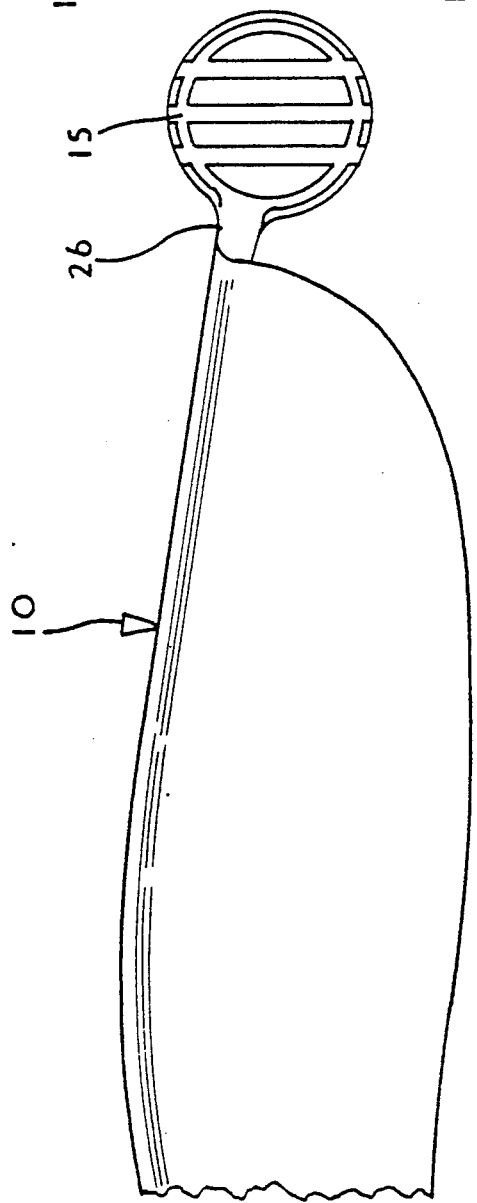
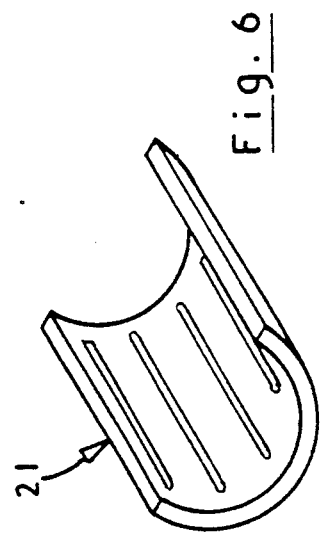

// 1

ATTACHMENT ASSEMBLY FOR A BICYCLE MUDGUARD

This is a continuation of co-pending application Ser. No. 07/525,834 filed on May 18, 1990 and now abandoned.

FIELD OF THE INVENTION

This invention relates to bicycle mudguards and has as an object the provision of an improved mudguard design which is such as to permit releasable attachment of the mudguard to any design of bicycle frame.

One of the most popular types of bicycle currently being produced is the "mountain bike". A more specific object of the present invention is accordingly the provision of an improved design of mudguard which can readily be attached to a "mountain bike".

SUMMARY OF THE INVENTION

According to the present invention there is provided a bicycle mudguard which includes a plastic moulding which, at one end thereof, includes a ball which forms part of a ball and socket fitment for attachment of the mudguard to the frame of a bicycle.

The ball and socket fitment may comprise a pair of clamp sections and a fastener for drawing the clamp sections together into clamping engagement with the ball and with the bicycle frame.

The plastics moulding may be of curvate aerofoil configuration being upturned at the end thereof remote from the ball. The overall length of the plastics moulding may be between 35 and 40 cms. with the width thereof of the order of 8 cms. at its narrowest point and 11 cms. at its widest point. The thickness of the plastics material may be such that the overall weight of the plastics moulding, including the ball, is no more than 160 gms. In use, the mudguard thus preserves the physical well being of the rider without adding undue weight to the bicycle and with the creation of minimal additional wind resistance.

Each of the clamp sections may include a pair of spaced clamping surfaces, one for engagement with the ball and the other for engagement with the frame of the bicycle. The fastener for drawing the clamp sections together preferably comprises a bolt and a wing-nut so that the mudguard can readily be attached to the bicycle frame without any requirement for tools.

BRIEF DESCRIPTION OF THE DRAWINGS

FIG. 4 is an exploded side view showing the clamp sections, the fastener and the end part of the mudguard, FIG. 5 is a perspective view of a the clamp sections and fastener, and FIG. 6 is a perspective view of a spacer.

DESCRIPTION OF THE PREFERRED EMBODIMENT

Figure 1:
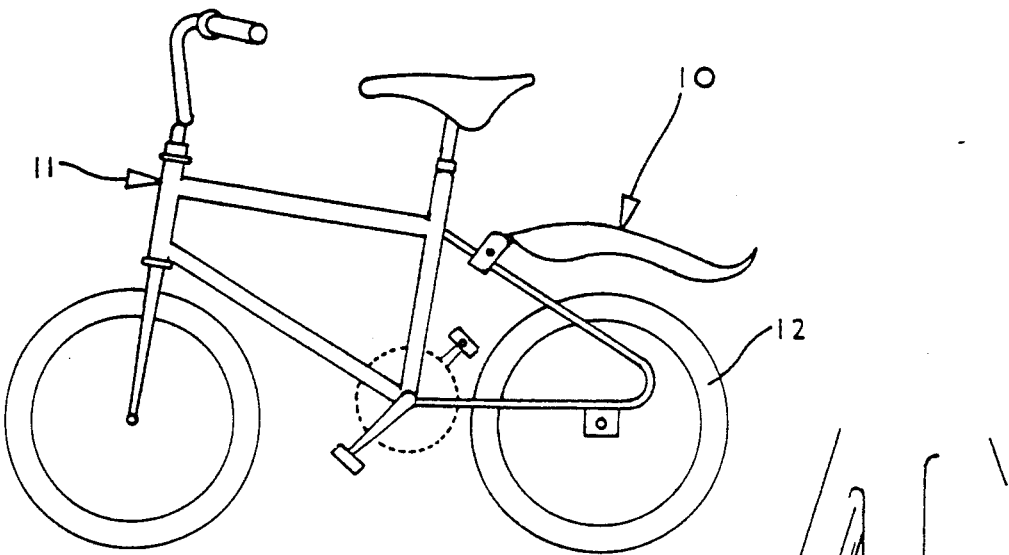
FIG. 1 is diagrammatic side view of a bicycle fitted with a mudguard in accordance with the present invention.
Figure 2:
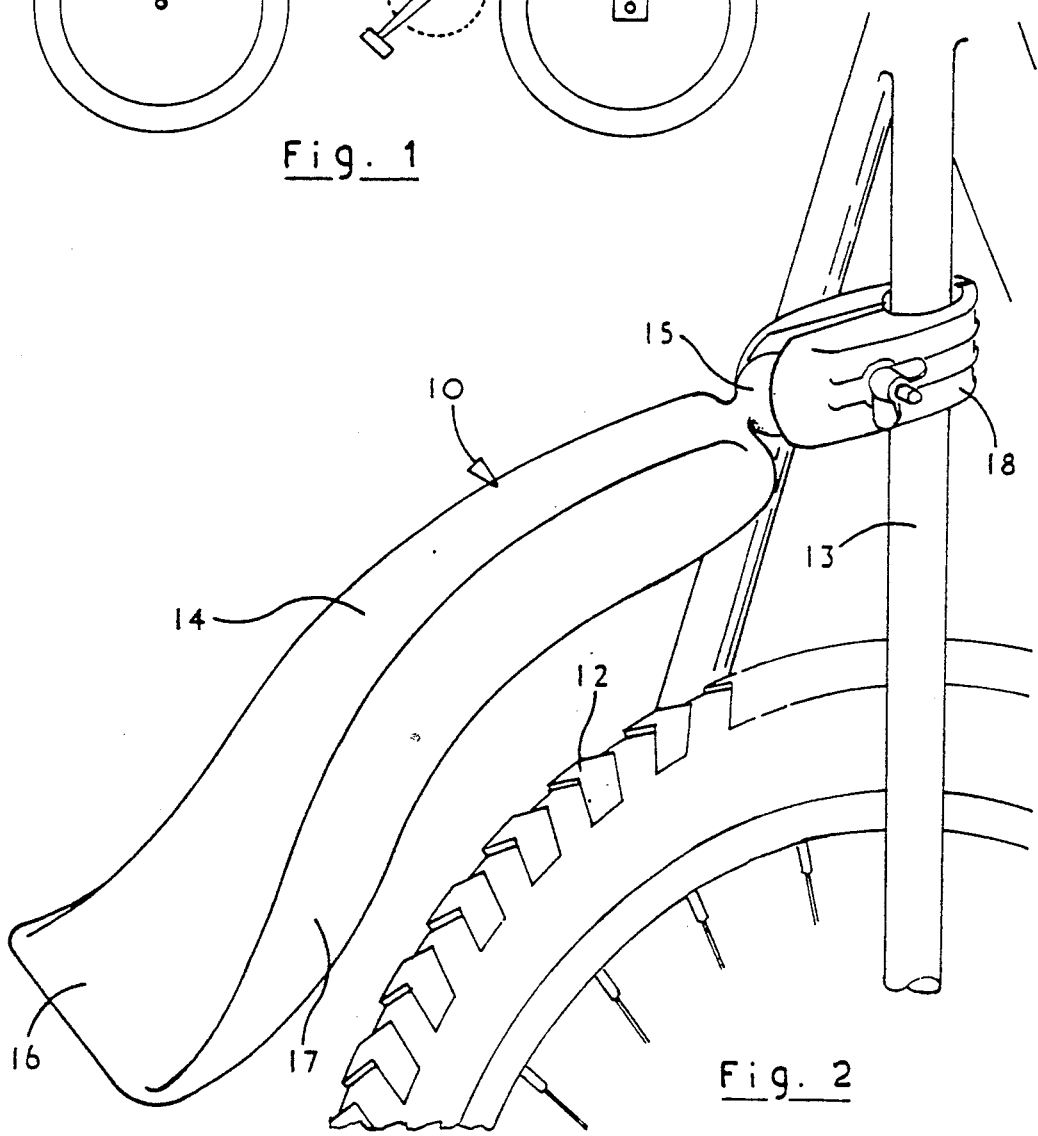
FIG. 2 is a perspective view of the mudguard and part of the frame of the bicycle, FIG. 3 perspective view of the mudguard and the two clamp sections by which it is attached to the bicycle frame.

As shown in FIGS. 1 and 2, the mudguard 10 is attached to the frame of the bicycle 11 so as to extend above the rear wheel 12 of the bicycle 11. In the particular arrangement shown in FIG. 2, the mudguard 10 is attached to one 13 of the upright members of the bicycle frame but it could equally well be attached to a horizontal member of the bicycle frame.

The mudguard 10 includes a main aerofoil section 14 at one end of which a ball 15 is provided, the aerofoil section 14 and ball 15 being formed integrally with one another by means of a one-piece plastic moulding. The aerofoil section 14 has an upturned end portion 16 and sides 17 which follow a predetermined profile which is such as to capture any centrifugally flung mud, water or other unwanted deposits picked up by the tread of the rear wheel 12.

The ball 15 is moulded so as to include a plurality of intersecting ribs as shown in FIGS. 3 and 4 so as to allow a degree of compression of the ball 15 when it is gripped by and between the two clamping members 18. The two clamping members 18 are formed as plastic mouldings and are identical to one another. Each member 18 includes a primary gripping portion 19 shaped to receive the ball 15 and having an operative surface which is formed with a plurality of pips or dimples to improve the frictional contact between the portion 19 and the ball 15. This enhanced frictional grip assists in ensuring that, even when the bicycle frame is subjected to rapid vibrations, e.g. when the bicycle is being ridden rapidly over cobbled streets, the mudguard will remain in the position in which it has been secured.

Each clamping member 18 also includes a secondary gripping portion 20 having an operative surface of part-cylindrical form for gripping engagement with an appropriate part of the bicycle frame. A rubber pad (not shown) is preferably first wound around the frame member and the clamping members 18 then engaged with the frame member. The frame members of bicycles are of varying diameters and, in order to allow for these different diameters, two separate pairs of spacers, such as the spacer 21 shown in FIG. 6, can be provided. If spacers are needed, one will be fitted within each of the portions 20 prior to fitment thereof in engagement with the bicycle frame member.

The two clamp members 18 are moved into clamping engagement with the bicycle frame member by means of a fastener assembly 22 which includes a bolt 23, a washer 24 and a wing-nut 25. The shank of the bolt 23 passes through apertures in the clamp members 18 which are located between the primary gripping portions 19 and the secondary gripping portions 20. In attachment of the mudguard to the frame, it is simpler to place the clamping members 18 in contact with the bicycle frame member, tighten the fastener assembly loosely, i.e. just sufficient to hold the clamping members 18 together around the bicycle frame member, and then insert the ball 15 into the space between the two primary gripping portions 19. The fastener assembly 22 is then fully tightened, if necessary using pliers, to secure the mudguard positively in a position such as that shown in FIG. 2.

The clamping portions 19 and 20 of each clamp member 18 are disposed effectively one on each side of the fastener assembly 22 so that, as the fastener assembly 22 is tightened, an extremely efficient clamping action is obtained. The ball 15 is carried on a short stem 26 which permits the mudguard 10 to be tilted into the required position after the ball 15 has been inserted into the space between the two primary gripping portions 19 and before the fastener assembly 22 is fully tightened.

As can be seen, the invention provides a mudguard which can simply and effectively be attached to many different sizes and designs of bicycle with the aerofoil section providing optimum protection, maximum eye appeal and minimal wind resistance.

I claim:

1. A bicycle mudguard having an attachment assembly including a ball and socket fitment for attachment of the mudguard to a bicycle including a frame, a front wheel and a rear wheel, said mudguard comprising a unitary plastic moulding, which plastic moulding includes:
1. a curvate aerofoil section having a first end and a second end,
2. an integral stem extending from the first end of said aerofoil section, and
3. an integral ball carried by said stem, said mudguard further including a pair of clamping members which have clamping surfaces shaped to receive and grip the ball, and to embrace and grip said frame adjacent to said rear wheel, and fastener means including a threaded bolt and nut assembly for drawing said clamping members together into gripping engagement with the ball and the frame, said ball, said clamping members and said fastener means together constituting said ball and socket fitment.

2. A bicycle mudguard according to claim 1, in which each of the clamping members has two spaced clamping surfaces, the one for engagement with the ball and the other for engagement with the frame of the bicycle, said clamping surfaces being arranged as respective opposed pairs of clamping surfaces, and in which the fastener means is disposed between the respective pairs of opposed clamping surfaces.

3. A bicycle mudguard according to claim 1, wherein the curvate aerofoil section is concavely arched in transverse cross-section facing downward toward the rear wheel, and wherein said second end of the aerofoil section is upturned and convexly arched in longitudinal cross-section.

4. A bicycle which includes a frame, front and rear wheels carried by the frame, a moulded plastic mudguard and attachment means for attachment of the mudguard to the frame, said attachment means including a ball and socket joint the ball of which is an integral part of the moulded plastic mudguard and the socket of which includes two separate identical plastic mouldings and fastener means for interconnecting the separate plastic mouldings for gripping attachment of both the integrally formed ball of the plastic mudguard and the bicycle frame.

5. A bicycle according to claim 4, in which the ball comprises a plurality of intersecting ribs and in which each of the plastic mouldings forming the socket of the ball and socket joint has a gripping surface which engages the ball and is formed with projections for enhancing the frictional grip between the socket and the ball.

6. A bicycle which includes a frame, a front wheel carried by the frame, a rear wheel carried by the frame, and a mudguard attached to the frame so as to extend above the rear wheel, said mudguard comprising a plastic moulding in the form of a curvate aerofoil section having a first end and a second end, a ball at said first end of said plastic moulding, which ball is an integral part of the moulding, said ball forming part of a ball and socket fitment for attachment of the mudguard to the bicycle frame, said ball and socket fitment also comprising a pair of separate clamp sections formed with apertures, a bolt having a shank which passes through the apertures and a nut which can be tightened on to the bolt to draw the clamp sections together into gripping engagement with the ball and the bicycle frame.

7. A bicycle according to claim 6, in which each of the clamp sections is a plastic moulding which includes first and second spaced clamping surfaces, each first clamping surface being shaped for engagement with the ball and provided with projections for obtaining an enhanced frictional contact with the ball, and each second clamping surface being of part-cylindrical form for gripping engagement with the bicycle frame.

8. A bicycle according to claim 7, in which the aperture in each clamp section is located intermediate the first and second clamping surfaces of the clamp section and in which the nut which engages the shank of the bolt is a wing nut to facilitate manual movement of the clamp sections into gripping engagement with the bicycle frame and with the ball.

* * * * *